United States Patent
Singaliese et al.

(10) Patent No.: US 6,917,683 B2
(45) Date of Patent: Jul. 12, 2005

(54) SIGNAL SPLITTER WITH TEST RELAYS ON AUXILIARY CIRCUIT BOARD AND SYSTEM USING SAME

(75) Inventors: Michael Singaliese, New Canaan, CT (US); Fred A. Traut, Milford, CT (US)

(73) Assignee: mPhase Technologies, Inc., Norwalk, CT (US)

( * ) Notice: Subject to any disclaimer, the term of this patent is extended or adjusted under 35 U.S.C. 154(b) by 0 days.

(21) Appl. No.: 10/287,150

(22) Filed: Nov. 4, 2002

(65) Prior Publication Data

US 2004/0086110 A1 May 6, 2004

(51) Int. Cl.⁷ .............................................. H04M 1/00
(52) U.S. Cl. ................................................. 379/413.04
(58) Field of Search .......................... 379/413.04, 326, 379/327, 328; 361/756

(56) References Cited

U.S. PATENT DOCUMENTS 5,724,421 A * 3/1998 Tuvy et al. ............. 379/413.04
6,438,226 B1   8/2002 Guenther et al.
6,628,525 B2 * 9/2003 Miller et al. ................ 361/756

* cited by examiner

Primary Examiner—Jack Chiang
(74) Attorney, Agent, or Firm—David Aker

(57) ABSTRACT

In signal-splitting equipment for multiple subscribers, circuitry is disposed on a signal-splitter card which connects with a back plane providing physical support and electrical connection to other splitter cards and to distant sites, as well as to an interface with a system conducting automatic testing of DSL circuits. Each splitter card also carries a separate relay card with signal-routing relay circuitry, the relay card being affixed by means of a switching connector having bypass circuitry which ensures normal communication of DSL signals and audio signals in the event that a relay card is disconnected from its signal-splitter card. During a testing of the equipment, the system operates the relays of the relay cards of the respective signal-splitter cards for a connection of test equipment to various equipment associated with a specific subscriber.

6 Claims, 5 Drawing Sheets

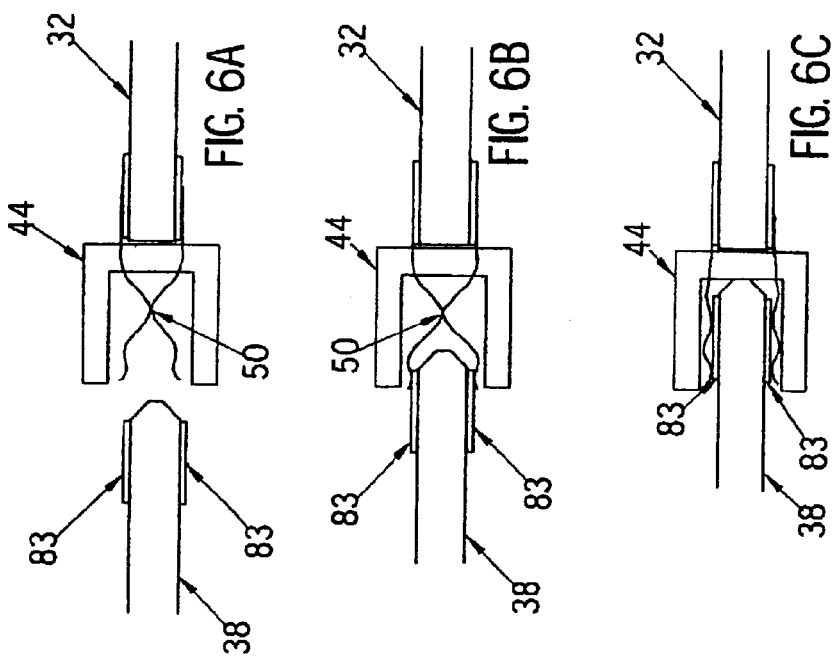
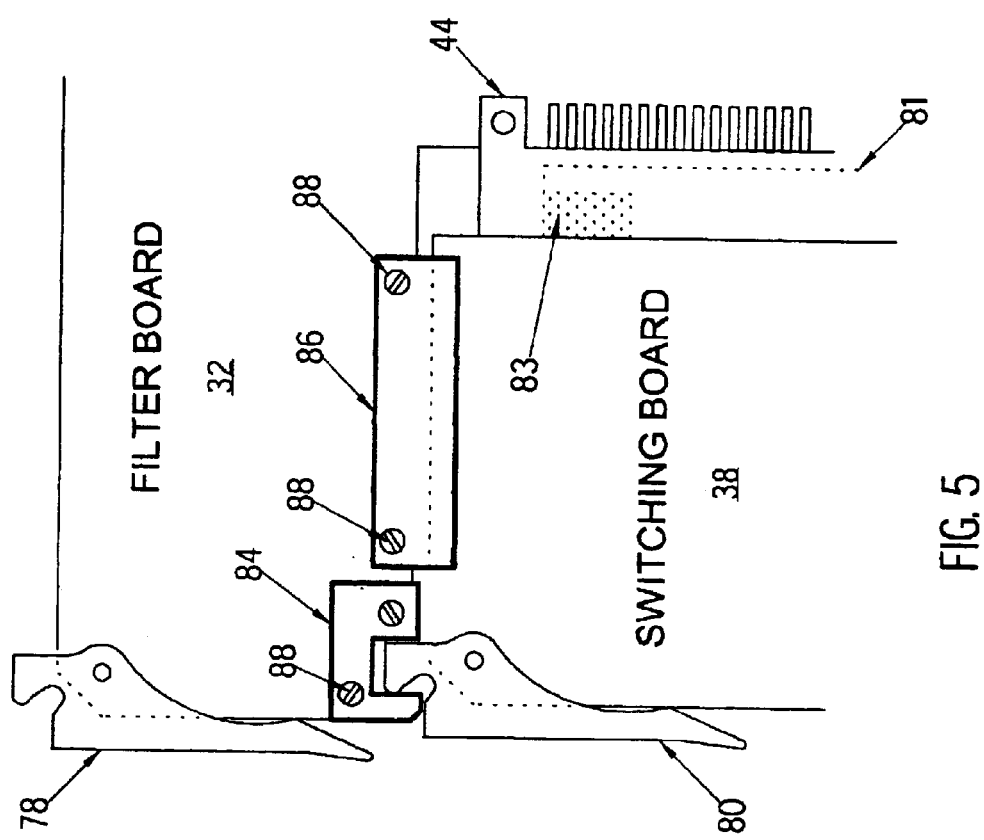

SIGNAL SPLITTER WITH TEST RELAYS ON AUXILIARY CIRCUIT BOARD AND SYSTEM USING SAME

BACKGROUND OF THE INVENTION

1. Field of the Invention

This invention relates to electronic circuitry located within a telephone company (telco) network for separating signals of a digital subscriber line (DSL), at relatively high carrier frequencies from a voice telephone signal at the relatively low audio frequency band. More particularly, it relates to an arrangement of circuit cards for this purpose, mounted to a back panel, wherein the cards are provided with facilities for the implementation of test procedures, and for a system in which such cards are used.

2. Prior Art

It is the practice in the transmission of DSL signals with audio signals that the DSL signals include both up- and down-link signals propagating between the telco and a subscriber. The up-link and the down-link signals are provided at different carrier frequencies to enable separation of the signals for communication on their respective channels. The up-link and the down-link signals are communicated by a twisted wire pair along with the audio signals, and signal-splitter circuitry is employed both at the telco and at the subscriber station (customer) to separate the DSL signals from the voice signal to permit separate processing of the DSL signals and the voice signals.

As a convenience in the construction of the signal-splitter circuitry within the telco network there is a practice of sometimes mounting multiple signal-splitting circuitry for each of numerous subscribers on a single circuit card at the telco. Even if only one signal splitting circuit, for a single subscriber, is placed on a card, numerous ones of these cards are mounted to a single back plane which provides for interconnection circuitry among the cards, as well as for connection of the DSL and voice signals to points distant from the telco. Cards can readily be replaced, and additional cards can be mounted to the back plane by use of connectors which facilitate connection and disconnection of individual ones of the cards.

Also provided at the telco is the function of testing any equipment associated with subscriber service (DSL equipment including but not limited to: the telco DSL modem, the subscriber DSL modem, the Public Switched Telephone Network, the signal-splitting circuitry and any wiring which carries the signals). In the testing, it is determined whether there is proper operation of the voice and DSL signals. Part of the testing may be accomplished in a manner which does not interfere with the signals, (for example, monitoring). The testing of the DSL equipment associated with a specific subscriber requires a connection of the DSL equipment to test-signal generators and signal measurement devices (test equipment). The connection of the test equipment to the DSL equipment under test is accomplished by electro-mechanical relays, the relays being preferred over purely electronic switching circuitry, to reduce the hazard of possible destruction from high voltages which may occur in the presence of a lightning strike. Furthermore, the relays can maintain connections even if there is no electrical power.

A major consideration in the design of the signal-splitting circuitry is the amount of space required to house and make connections to the numerous cards mounted to the back plane. By way of example, the relay circuitry itself requires space, this space being in addition to the space required by the signal-splitting cards. In presently available signal-splitting equipment, the equipment employs additional cards containing the relay circuitry, the additional cards being mounted nearby or alongside the signal-splitting cards, to the back plane. A large area of the back-plane is required solely for connections between the relays and signal-splitting circuit cards. As a result, the presently available signal-splitting equipment suffers from the disadvantage that much of the space which might be employed for the signal-splitting cards alone is being used for accommodating the additional relay cards. Therefore, a reduced number of signal-splitting cards can be housed within the equipment of a signal-splitting facility of a telco. In other similar equipment, the relays reside on the same card as the signal-splitting circuitry, preventing the possibility of adding or removing the relays alone without disruption of DSL service.

SUMMARY OF THE INVENTION

It is an object of the invention to provide a filter board system for servicing digital subscriber lines, which system is modular in nature, so that new circuit boards can be readily added, and so that as telephone company test capabilities expand, circuit boards do not become obsolete, but can instead continue to be used.

It is a further object of the invention to provide a filter board system which can be built in a modular fashion, and wherein service to the subscriber is not interrupted as DSL components are added.

It is an additional object of the invention to provide such a system which can connect telco test equipment to various portions of the system and to the subscriber line, to test those portions and to test the subscriber line.

It is still another object of the invention to provide a system which is conservative of space on the backplane of a telephone filter board rack, when services (such as test access) are added.

The aforementioned disadvantage are overcome, these objects and others are achieved, and other benefits are provided, by a construction of signal-splitting equipment, in accordance with the invention, wherein the relay circuitry for multiple subscribers is located on a segment of circuit board which is affixed, by means of a connector, to the signal-splitting board containing the signal-splitting circuitry for which the routing of signals is to be accomplished. The invention thereby provides for an arrangement of the relay circuitry and the corresponding signal-splitting circuitry wherein the circuit board segment of the relay circuitry (the relay card) and the circuit board of the corresponding signal-splitting circuitry (the signal-splitting card) are coplanar, i.e., "Board within a Board." This avoids the wastage of space in an arrangement of relay cards located nearby or alongside of the signal-splitting cards, such that each of a succession of connectors of the back plane is available for a signal-splitting card, thereby to maximize the number of signal-splitting cards connected to the back plane while eliminating the need to utilize area of the back plane for connections between the relays and signal-splitting cards. It is noted that the terms "board", "circuit board" and "card" are used interchangeably herein, in accordance with general practice in the art.

In accordance with a feature of the invention, a further card is mounted to the back plane to serve as an interface to a system conducting automatic testing of the DSL equipment of the numerous subscribers. The interface card transmits signals via the back plane and through the signal-splitter cards to operate the relays of their respective relay cards, wherein operation of a relay provides for connecting test equipment to the DSL equipment, and other equipment associated with a specific subscriber. Also included within each of the signal splitter cards is bypass circuitry which ensures normal communication of the DSL signals and the audio signals in the event that relay card is disconnected from its signal-splitter card. The bypass circuitry is implemented by switching contacts included as part of a connector mounted on the signal-splitting card for receiving the relay card such that, upon a disconnection of the relay card, the contacts of the connector make the bypass connection before a breaking of the connection between the relay card and the signal-splitting card.

The invention is also directed to the configuration of the signal-splitter card, the switching or relay card, and the assembly of the signal-splitter card and the switching or relay card.

BRIEF DESCRIPTION OF THE DRAWINGS

The foregoing aspects and other features of the present invention are explained in the following description, taken in connection with the accompanying drawings, wherein:

FIG. 5 is an enlarged view of a portion of the circuit boards of FIG. 2A and FIG. 2B, when assembled.

FIGS. 6A, 6B and 6C illustrate the implementation of the make before break connections used, in accordance with invention, in the system of FIG. 1

DETAILED DESCRIPTION OF THE PREFERRED EMBODIMENT

Figure 1:
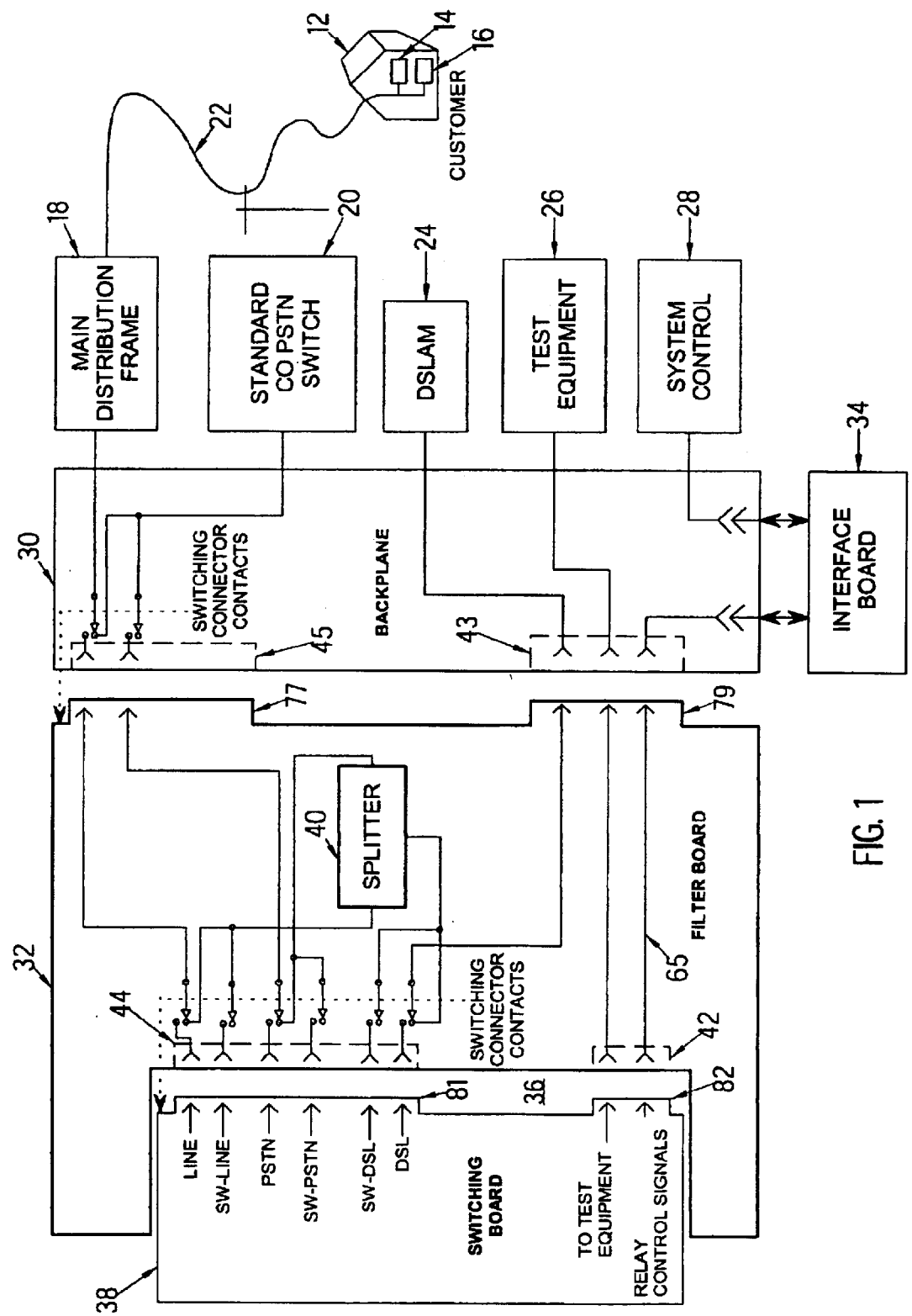
FIG. 1 is a block diagram of a telephone system including components in accordance with the invention, connected thereto.

Referring to FIG. 1, there is shown a block diagram of a telephone system with connected components incorporating features of the present invention. Although the present invention will be described with reference to the single embodiment shown in the drawings, it should be understood that the present invention can be embodied in many alternate forms of embodiments. In addition, any suitable size, shape or type of elements or materials could be used, including different circuit elements. Like reference numerals in the drawings indicate like components. The prefix "S" associated with a signal indicates that it is a splitter connection which is routed by switching contacts to the backplane, in the absence of a switching board, or to relays of a switching board, when one is installed.

In FIG. 1, a customer 12, having a telephone 14 and as often in many cases a computer 16, is connected to a main distribution frame 18 of a standard telco Public Switched Telephone Network or PSTN switch 20. The connection is generally made by means of a main distribution frame 18 and a subscriber line 22, which is generally copper wire twisted pair, as is well known in the art. Additional teleco equipment includes a central office DSL modem, also known as a Digital Subscriber Line Access Multiplexer or DSLAM 24, test equipment 26, and a system control 28. The latter may be a computer or a microprocessor controlled facility, which provides commands and control to the system, and receives replies indicating that certain functions have been accomplished.

As shown in FIG. 1, a circuit board that serves as a backplane 30 is provided. Backplane 30 has a series of connectors for receiving a filter board 32 for one or more subscriber lines. An interface board 34, associated with backplane 30, is used to make required logical connections between system control 28 and backplane 30. Interface board 34 may conveniently contain a power supply (not shown), and appropriate connections for providing power to the equipment associated with backplane 30.

In accordance with the invention, each filter board 32 is configured with a rectangular cut out portion 36, and suitable connectors 42 and 44 (discussed in more detail with respect to FIG. 2A) to allow filter board 32 to receive and make electrical connection to a switching board 38. Switching board 38, generally has a series of relays, which under appropriate logic control, make electrical connections between test equipment 26 and various portions of the telephone system, allowing the addition of test access to those portions, without interruption of service to the customer, as more fully described below.

Central to filter board 32 is a POTS (Plain Old Telephone Service) filter or combiner/splitter, hereinafter a splitter 40, of a type well known in the art. Splitter 40 is bi-directional, acting as a splitter for signals from the subscriber line and as a combiner for signals from the PSTN switch 20 and DSLAM 24 (FIG. 1) to the subscriber line.

Figure 2A:
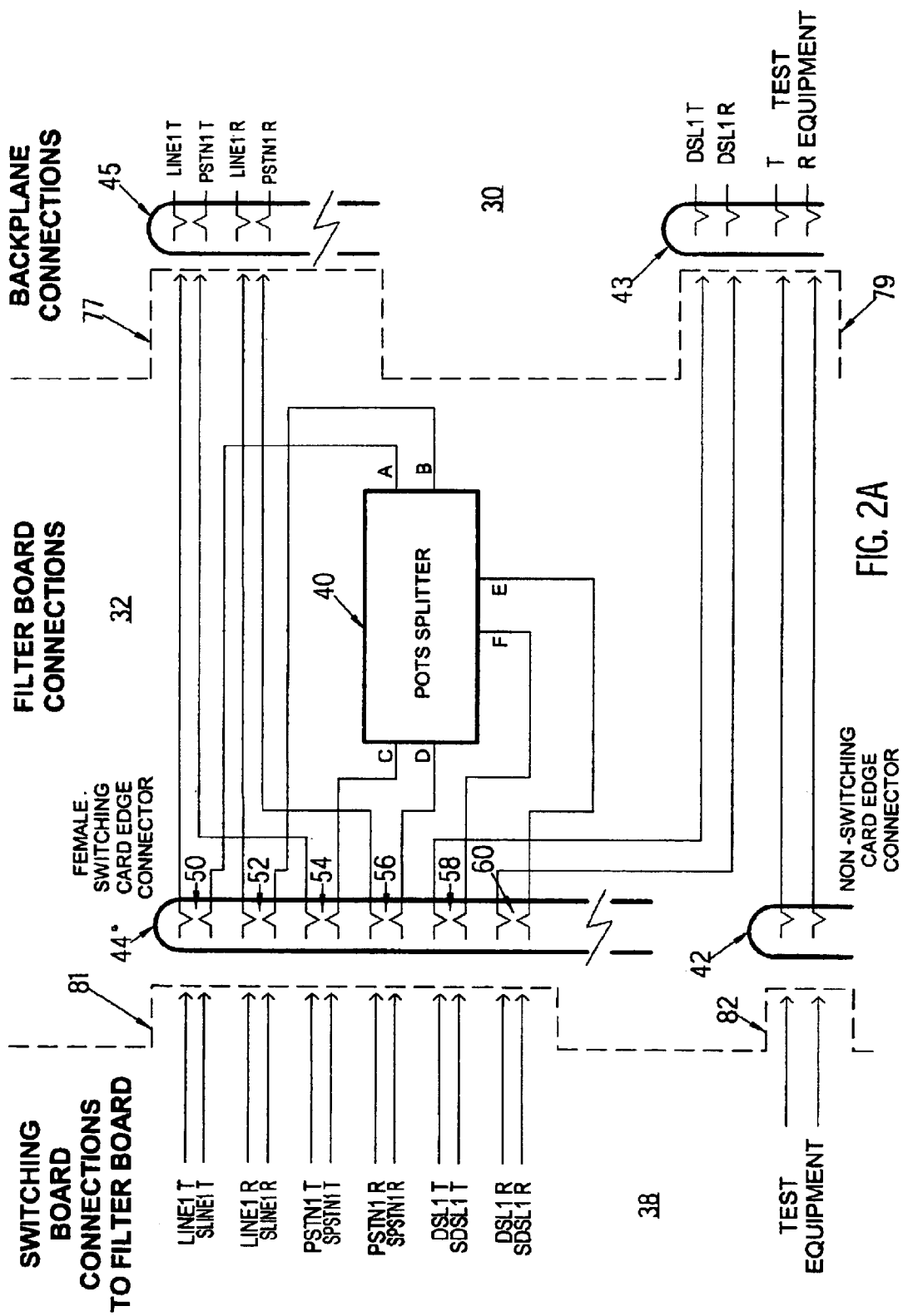
FIG. 2A is a diagram of the filter board of FIG. 1, showing connections to the switching board and the backplane of the system of FIG. 1.

FIG. 2A is a schematic diagram of filter board 32 and its connections to backplane 30 and switching board 38. Filter board 32 is connected to backplane 30 by a conventional non-switching card edge connector 43 and a switching card edge connector 45 with make-before-break contacts. Connector 43 carries test signals between backplane 30 and filter board 32, and also serves to connect filter board 32 to DSLAM 24. Connector 45 carries signals between backplane 30 and filter board 32. If filter board 32 is removed from the backplane 30, then the subscriber line is connected directly to the PSTN (LINE1 T is connected to PSTN1 T and LINE1 R is connected to PSTN1 R). When filter board 32 is inserted or removed, the make before break feature of connector 45 assures that telephone service for the subscriber is not interrupted.

Filter board 32 also has a conventional non-switching card edge connector 42, which serves to connect test equipment signals between filter board 32 and switching board 38, when the latter is inserted into the former. Finally, filter board 32 has a switching card edge connector 44 of the make-before-break variety, which also connects filter board 32 to switching board 38.

When filter board 32 is inserted into backplane 30, then the subscriber line is no longer connected directly to the PSTN (LINE1 T is not connected to PSTN1 T and LINE1 R is not connected to PSTN1 R). If no switching board 38 has been inserted into filter board 32, then the top two contacts 50 of connector 44 are electrically connected to one another, and the next lower two contacts 52 are electrically connected to one another. The result is that LINE1 T is connected to terminal A of POTS splitter 40. LINE1 R is then connected to terminal B of POTS splitter 40. Voice signals, that is those in the lower frequency range, are separated by POTS splitter 40 and appear across terminals C and D thereof. Terminal C is connected via contact pair 54 to PSTN1 T, while terminal D is connected to PSTN1 R by contact pair 56, thus connecting the voice signal to the backplane 30 and therefore to the PSTN. The DSL signal appears across terminals E and F of the POTS splitter 40 and is connected to appropriate terminals of connector 43 by contact pairs 58 and 60 of connector 44. Thus the DSL signal is connected to backplane 30 and to DSLAM 24 (FIG. 1).

Figure 2B:
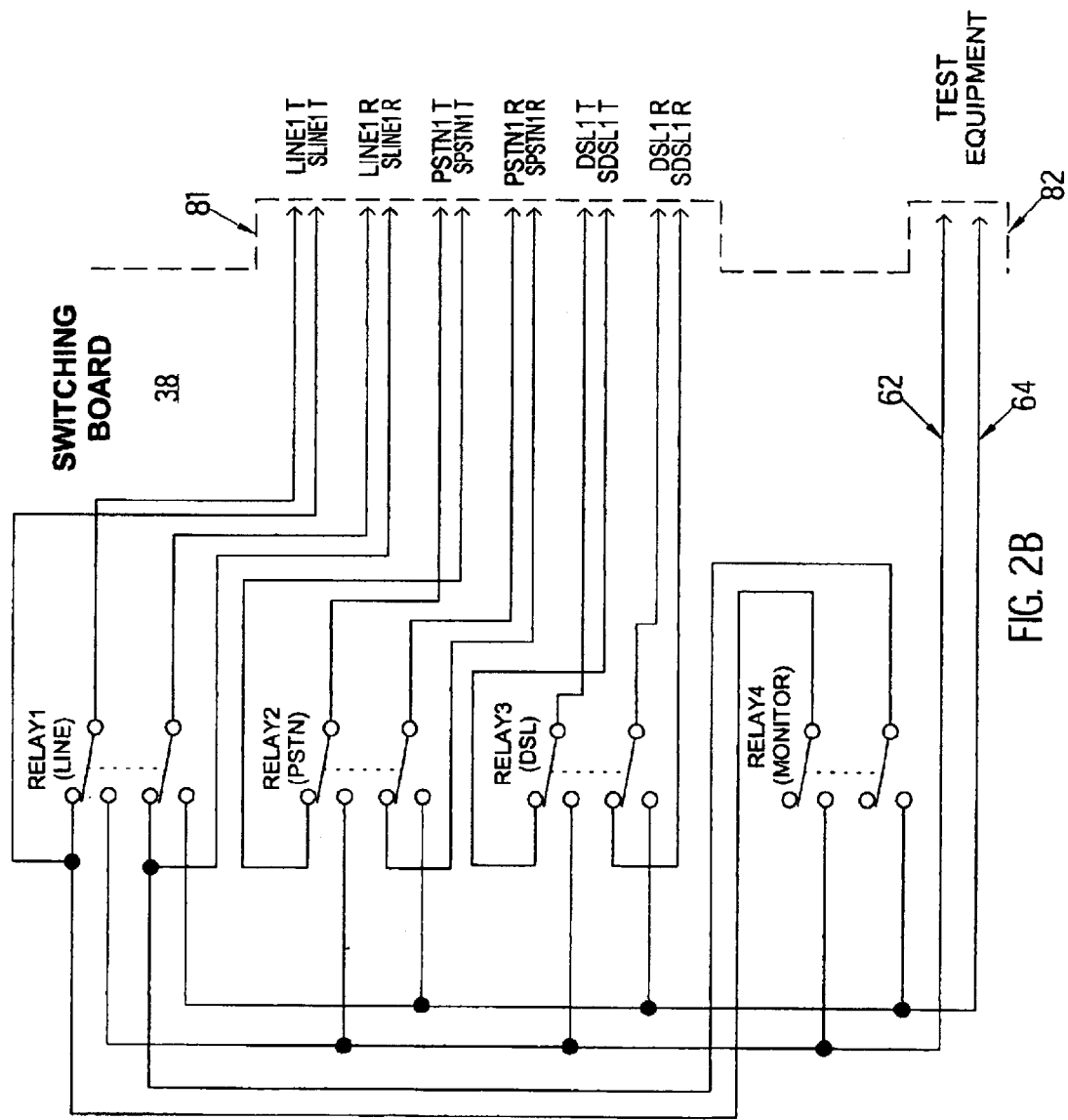
FIG. 2B is a schematic diagram of the switching board of the system of FIG. 1, and may be aligned with FIG. 2A to show the connections between the filter board and the switching board.

Reference is now made to FIG. 2B, when assembled to the left of FIG. 2A. In accordance with the invention, when a switching board 38 is plugged into filter board 32, contact is first made to a series of relays (RELAY 1 through RELAY 4, each a DPDT relay) on switching board 38, and then contact pairs 50, 52, 54, 56, 58 and 60 are opened, due to the make-before-break nature of connector 44. This has the result of putting the relays into the circuit, as contact pairs 50, 52, 54, 56, 58 and 60 are no longer shorted. In addition, signals to and from test equipment 26 (FIG. 1) are conducted through connector 43 to filter board 32, and then via connector 42 to switching board 38.

A first lead 62 of the leads carrying these test signals on switching board 38 are connected to one normally open contact of each of RELAY 1 through RELAY 4. A second lead 64 of these leads is connected to the other normally open contact of each of RELAY 1 through RELAY 4.

It is noted that for simplicity, control lines for each of RELAY 1 through RELAY 4 are not shown. In practice, each of the relays is driven by a control line from interface board 34, the lines being collectively represented as line 65 in FIG. 1. The signals on the control lines may be derived in a number of ways, such as by a logic decoder, as is well known in the art, based on command signals from system control 28, in accordance with which part of the system is to be tested, as more fully set forth below.

In FIG. 2B, each relay is shown in its deactivated position or state. In these states, the following occur: The top pole of RELAY 1 serves to connect LINE1 T to SLINE1 T, while the bottom pole of RELAY 1 serves to connect LINE1 R to SLINE1 R. The top pole of RELAY 2 serves to connect PSTN1 T to SPSTN1 T, while the bottom pole of RELAY 2 serves to connect PSTN1 R to SPSTN1 R. The top pole of RELAY 3 serves to connect DSL1 T to SDSL1 T, while the bottom pole of RELAY 3 serves to connect DSL1 R to SDSL1 R. Thus, as long as RELAY1, RELAY2 and RELAY3 are not activated, the connections are identical to those made when switching board 38 has not been inserted into filter board 32 and contacts 50, 52, 54, 56, 58 and 60 remain closed.

If RELAY 1 is activated, LINE1 T is connected to test equipment line 62, and LINE1 R is connected to test equipment line 64. SLINE1 T and SLINE1 R are effectively disconnected, and no signal is supplied to terminals A and B of POTS splitter 40. Thus, telephone and DSL service for the subscriber on that line (subscriber line 22 of FIG. 1) is temporarily interrupted, to allow testing of that line, which has in effect been isolated for testing. However, as soon as RELAY 1 is deactivated, the test equipment is disconnected, and service is restored, as RELAY 1 returns to the state shown in FIG. 2B.

If RELAY 2 is activated, PSTN1 T is connected to test equipment line 62, and PSTN1 R is connected to test equipment line 64. SPSTN1 T and SPSTN1 R are effectively disconnected, and no signal is received from terminals C and D of POTS splitter 40. Thus, telephone service for the subscriber on that line is temporarily interrupted, to allow testing of the circuits of the PSTN which service that line. The PSTN has in effect been isolated for testing. DSL service is not interrupted. However, as soon as RELAY 2 is deactivated, the test equipment is disconnected, and service is restored, as RELAY 2 returns to the state shown in FIG. 2B.

If RELAY 3 is activated, DSL1 T is connected to test equipment line 62, and DSL1 R is connected to test equipment line 64. SDSL1 T and SDSL1 R are effectively disconnected, and no signal is received from terminals E and F of POTS splitter 40. Thus, DSL service for the subscriber on that line is temporarily interrupted, to allow testing of the circuits of the DSLAM circuitry 24 (FIG. 1) which services that line. The DSLAM has in effect been isolated for testing. Ordinary telephone service for that line is not interrupted. However, as soon as RELAY 3 is deactivated, the test equipment is disconnected, and DSL service is restored, as RELAY 3 returns to the state shown in FIG. 2B.

RELAY 4 performs one additional function. When activated, RELAY 4 simply connects test equipment line 62 to the connection between LINE1 T and SLINE1 T, and test equipment line 64 to the connection between LINE1 R and SLINE1 R, thus effectively placing the test equipment across the subscriber's telephone line. This allows the telco to monitor the line while communications are being conducted. In this case, subscriber line 22 is not isolated from the telephone system. Thus, testing may be performed without interruption of any service. It is noted that RELAY 4 could be substituted with a normally-open DPST type relay and still perform the same function.

By activating RELAY 1 and RELAY 2 simultaneously, it is also possible to monitor the line by bypassing the filter board 32, thus permitting a determination as to whether there is a malfunction in a path through the splitter 40. If a proper telephone connection may be made only in this manner, a difficulty with the splitter 40 is indicated. Thus, this determination may be made easily. Also, by activating RELAY 1 and RELAY 2 simultaneously, the telco is able to establish an emergency voice connection for the subscriber's line. Since the splitter 40 is bypassed, DSL service for the line is temporarily interrupted.

Thus, filter board 32 serves to connect the subscriber line to the PSTN, either directly if filter board 32 is not carrying a switching board 38, or through a switching board 38, when it is plugged into filter board 32. This aspect of the invention allows the telco to have a great deal of flexibility. Generally, it is necessary to take up a great deal of "real estate" on the backplane board for both filter board connectors and switching board connectors, as described above in connection with the prior art. Alternatively, it is necessary to replace an entire non-switching filter board with a filter board having switching facilities thereon. This results in wasteful purchases of new boards. However, in accordance with the present invention, a modular approach may be used to building the network, with the switching boards being added to the installed filter boards, as the system expands, and the need arises. For example, if only filter boards are to be installed, and switching capability is not yet needed, interface board 34 (FIG. 1) need not yet be purchased and installed.

Figure 3:
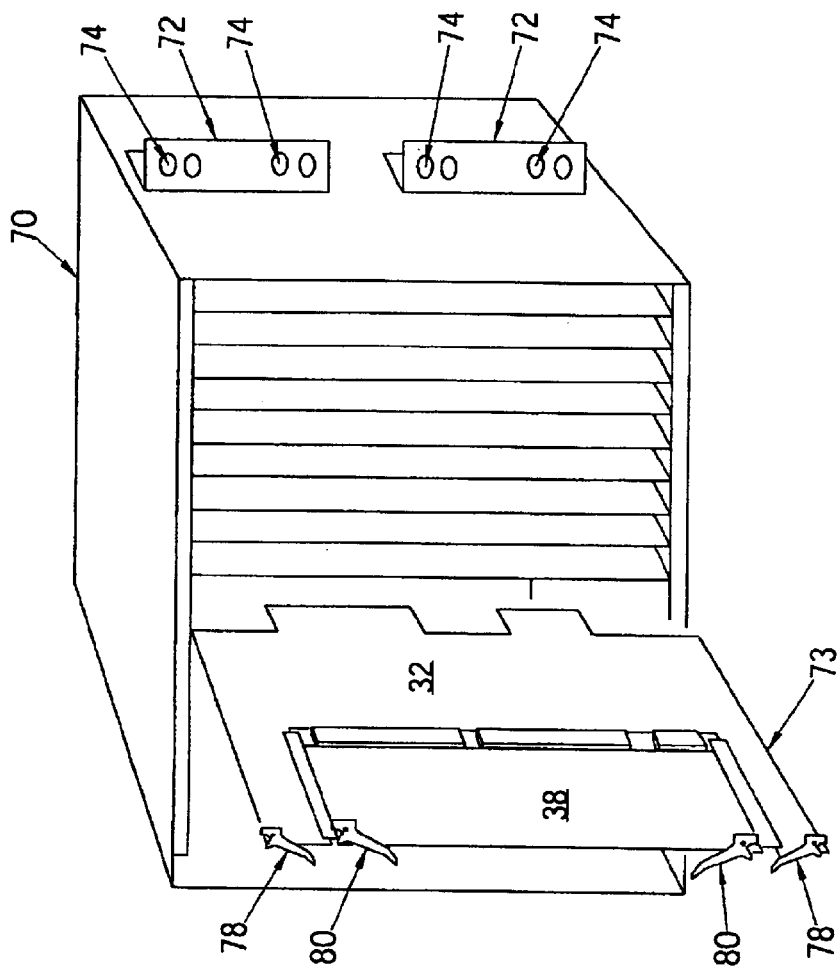
FIG. 3 is a front perspective view of a card rack which may be used for the circuit cards of the embodiment of the system of FIG. 1, FIG. 2A and FIG. 2B.

Referring to FIG. 3, a standard equipment housing 70 may be designed to fit into a 23 inch wide (58.4 cm) electronic equipment rack (not shown). It may be mounted to the rack by brackets 72 (only two of four being shown in FIG. 3) and appropriate screws (not shown) extending through openings 74, in a manner well known in the art. Housing 70 may be 11.5 inches (29.2 cm) deep and 24 inches high (61.0 cm). Housing 70 is designed to contain backplane 30, which may serve as a "mother board" having suitable connectors into which the connectors of other boards plug. These boards may include an interface board 34 (FIG. 1) and, for example, a total of twenty four board assemblies 73, each containing 24 ports, for a 576 port unit. In accordance with the invention, each assembly 73 includes a filter board 32 and a switching board 38. Filter board male edge connectors 77 and 79, which are protruding sections of filter board 32, are received in connectors 45 and 43, respectively, of backplane 30 (FIG. 1, FIG. 2A), when an assembly 73 is inserted into housing 70.

Figure 4:
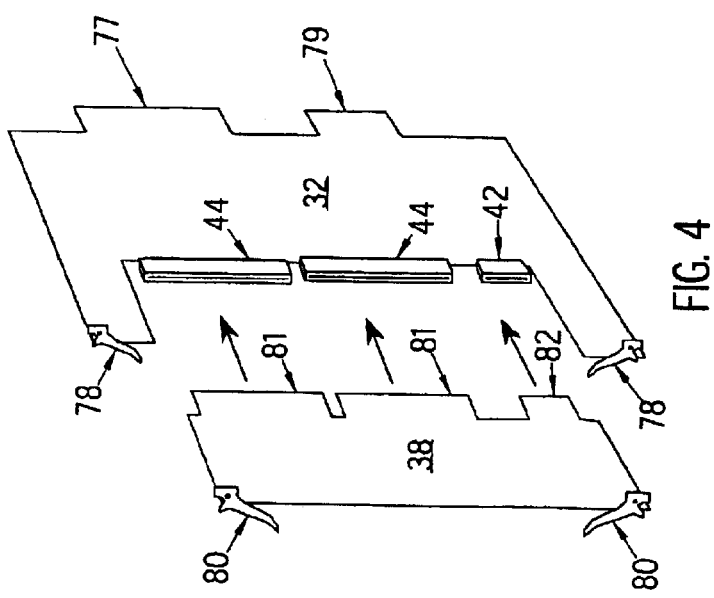
FIG. 4 is a perspective view illustrating the manner in which the switching board of FIG. 2B fits into the filter board of FIG. 2A.

Referring also to FIG. 4, each filter board 32 includes a pair of ejector-inserters 78 to facilitate ejection and insertion of filter board 32 within a suitable slot in housing 70. Each switching board 38 includes a pair of ejector-inserters 80 to facilitate ejection and insertion of switching board 38 within filter board 32. Male card edge connectors 81, which are protruding sections of switching board 38, have contacts 83 (FIG. 5 and FIG. 6), which are accepted in connectors 44. An additional male edge connector 82 has contacts similar to contacts 83, which are accepted in connector 42.

Referring to FIG. 5, additional details of the assembly 73 of a filter board 32 and a switching board 38 are shown. Each ejector-inserters 80 has portions which interact with portions of a push block 84, as is well known in the art. The top and bottom edge (not shown) of switching board 38 are each received in a board to board card guide 86, only one of which is shown in FIG. 5. Suitable hardware, such as screws 88, attach push block 84 and card guide 86 to switching board 38.

The features and operation of the make-before-break contacts used in the invention are shown in FIGS. 6A, 6B and 6C, as applied to contacts 50, 52, 54, 56, 58 and 60 on filter board 32. The illustrated contact pair may be any one of these, or one associated with connector 45, which is mounted on backplane 30 (the operation is identical). Contact pair 50 is shown as exemplary.

In FIG. 6A, contact pair 50 is shorted, and contacts 83 of switching card edge connector 81 of switching board 38 have not yet been engaged. In FIG. 6B, switching board contacts 83 of switching card edge connector 81 of switching board 38 have been engaged, so the "make" has occurred, but contact pair 50 remains shorted. Finally, in FIG. 6C, when switching board 38 has been fully inserted into filter board 32, and contacts 83 of card edge connector 81 of switching board 38 have been fully engaged, contact pair 50 is forced open, and the "break" has occurred. As explained above, this feature advantageously allows for the insertion or removal of switching board 38 from filter board 32, without interruption of service to the customer, when telco testing ability is being upgraded by adding switching board 38, or when switching board 38 is being replaced, due to maintenance requirements. Further, this feature allows the insertion and removal of filter board edge connectors 77 and 79 of filter board 32 into connectors 45 and 43 of backplane 30 (FIG. 2A) without interrupting basic telephone service. Although this is not a major issue for maintenance, due to the generally very high reliability of the filter boards 32, it is important when a customer adds DSL service, and a filter board 32 must be installed.

It should be understood that the foregoing description is only illustrative of the invention. Various alternatives and modifications can be devised by those skilled in the art without departing from the invention. For example, although mechanical relays are generally used at the present time for the reasons stated above, the invention is not so limited, and also contemplates solid state relays, should their use ever become prevalent. Accordingly, the present invention is intended to embrace all such alternatives, modifications and variances which fall within the scope of the appended claims.

What is claimed is:

1. Signal-splitting equipment, for separating DSL signals from audio signals in a telephonic communication system, comprising:

a rack supporting an array of signal-splitter cards connected to a back plane providing electric signal connections to the signal-splitter cards, each of the signal-splitter cards having at least one filter channel for processing communicated signals of a respective one of multiple subscribers;

a plurality of relay cards supported by respective ones of the signal-splitter cards, each of said relay cards being affixed to its respective signal-splitter card by a connector having bypass circuitry which ensures normal communication of high-frequency signals and low-frequency signals in the event that a relay card is disconnected from its signal-splitter card; and wherein, during the testing of circuitry, relay-control signals are communicated via the back plane and via the respective signal splitting cards to operate the relays of the corresponding relay cards for connection of test equipment to various parts of the system which serve the respective subscriber.

2. Signal-splitting equipment, according to claim 1, wherein the signal-splitter cards of said array of signal-splitting cards are arranged in parallel, and each of said relay cards is mounted in coplanar arrangement with its corresponding signal-splitter card to attain a compact configuration to said array of signal-splitter cards.

3. Signal-splitting equipment, according to claim 1, wherein said high-frequency signals are DSL signals, and said low frequency signals are audio signals.

4. Signal-splitting equipment, according to claim 1, wherein said relay-control signals are provided by a system and said array of signal-splitter cards includes a system-interface card for communication of signals between said system and said back plane.

5. Signal-splitting equipment, according to claim 1, wherein said relays include at least one of the following:

a relay for connection of the test equipment to the subscriber line so that the subscriber line is isolated for testing;

a relay for connection of the test equipment to a public switched telephone network so that the public switched telephone network is isolated for testing;

a relay for connection of the test equipment to digital subscriber line equipment so that the digital subscriber line equipment is isolated for testing; and a relay for connection to the subscriber line without disrupting service to the subscriber.

6. Signal-splitting equipment, according to claim 5, wherein said signal splitting cards are configured so that when a relay for connection of the test equipment to the subscriber line so that the subscriber line is isolated, and a relay for connection of the test equipment to circuitry of the public switched telephone network so that that circuitry of the public switched telephone network for that subscriber is isolated for testing, are activated simultaneously; a splitter servicing that subscriber on said signal splitting card is bypassed to permit a determination as to whether there is a malfunction in that splitter.

* * * * *